July 22, 1969     F. KRUMBEIN ET AL     3,456,892

FILM REEL HOLDER

Filed Sept. 5, 1967

United States Patent Office 3,456,892
Patented July 22, 1969

3,456,892
FILM REEL HOLDER
Fritz Krumbein, Stuttgart-Mohringen, and Willy Rauscher, Stuttgart, Germany, assignors to Zeiss Ikon Aktiengesellschaft, Stuttgart, Germany, a corporation of Germany
Filed Sept. 5, 1967, Ser. No. 665,505
Claims priority, application Germany, Sept. 22, 1966, Z 12,432
Int. Cl. B65h 49/32
U.S. Cl. 242—68.3      7 Claims

ABSTRACT OF THE DISCLOSURE

A film reel holder for film reels having different mounting bores. The holder comprises a cylindrical core having a diameter to accommodate a film reel having the smallest mounting bore, and at least three circumferentially spaced coupling members on the cylinder core for engaging corresponding radial slots extending from the center bore of film reels having differently sized mounting bores.

The coupling members may comprise axially extending ribs on the cylindrical core or axially extending steel wires of which the one ends are secured to the free end of the core while the other ends extend into radial slots provided in a flange on the core.

---

The invention relates to a film reel holder for receiving film reels having at least three coupling slots radiating from their centrally arranged receiving hole.

It is known that in film reels of the type mentioned and used for the various sorts of films the center bores have a variety of different diameters. This calls for a remedy in projectors with which different sorts of films are to be projected. In known manner is this accomplished by adapting the diameter of the core of the reel holder to the smallest receiving bore of a film reel and, depending upon requirement, providing extra intermediate sleeves for reels with bores of larger diameters.

This is an awkward procedure, the more so, since an intermediate sleeve may be misplaced or lost when not in use.

It is the object of the invention to overcome the aforementioned disadvantages by creating a film reel holder which without further manipulations is adapted to receive and centrally hold film reels having center bores of different diameters.

This object in accordance with the invention is attained in that the film reel holder for the purpose of receiving different reels of the type mentioned is provided with at least three radially outwardly extending coupling members, the angular position and dimensions of which are adapted to those of the radial coupling slots in the film reel so that they may engage the three coupling slots of any sort of film reel simultaneously, and in that the diameter of the core proper of the reel holder is smaller than the smallest receiving bore of any customary film reel.

The engagement of these coupling members according to the invention with the coupling slots in the film reels makes necessarily for a centric placing of the film reels, regardless whether or not the holder core fits the film reel bore.

The coupling members according to the invention may comprise three ribs of which at least one is made resilient.

The resilient member is elastic perpendicularly to the coupling slot of the film reel, but it may also in radial direction resiliently engage the coupling slot associated with it. This prevents the film reel from sliding off the reel holder.

The radially resilient coupling member may simultaneously form a detent which additionally secures the film reel in its position on the holder core.

The coupling members may be made of steel wire as well as of plastic.

If the coupling members are made of plastic, they can be manufactured in one piece with the core. This is particularly economical.

In order to further simplify the operation of the apparatus with which the film reel holder according to the invention is used, all of the coupling members may be made resilient in such a manner that they resiliently converge in radial direction to a receiving bore of a film reel having the smallest diameter possible.

Finally, the invention also provides for six of such resilient coupling members equidistantly spaced from each other by 60°.

The three or six resilient coupling members radially converging toward the center bore of a film reel permit a placing of the film reel onto the film reel holder in any desired angular position. The reel holder core in the center bore of the film reel rotates until the first three coupling members lying in the direction of rotation engage the three coupling slots of the film reel.

The invention will now be described in further detail by way of two exemplary embodiments and with reference to the accompanying drawings from which features non-essential to the invention were omitted for clarity's sake.

Figure 1:
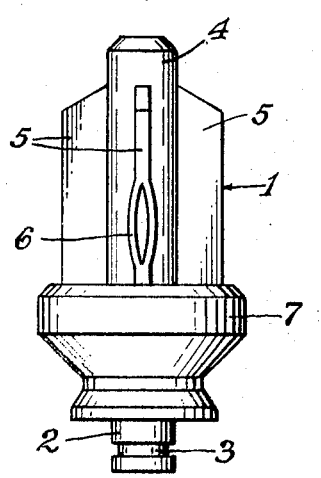
FIG. 1 is an elevation view of the film reel holder provided with three coupling members according to the invention, of which one coupling member is made resilient.
Figure 2:
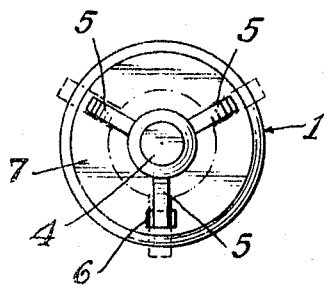
FIG. 2 is a top view of FIG. 1.

Referring to FIGS. 1 and 2, the film reel holder 1 is made of plastic and consists of one integral piece. Concentrically embedded in the base portion of the film reel holder 1 is a steel shaft 2 provided with an annular groove 3 for accommodating a safety ring which is to prevent a sliding of the steel shaft 2 out of its bearing after the mounting. The film reel holder 1 proper consists of a cylindrical core 4, three coupling members or ribs 5, of which one is made resilient between its ends at 6, and a flange 7 forming a pulley at the same time.

FIG. 2 clearly shows that due to the circular opening in the film reel illustrated by dash-dot lines and the coupling slots emanating therefrom, in conjunction with the radial equiangular arrangement of the coupling members 5 on the core 4 and the coupling slots in the film reel, the film reel can be received by the film reel holder concentrically only. The resilient part 6 in one of the coupling members 5 secures the film reel against sliding off from the film reel holder 1.

Figure 3:
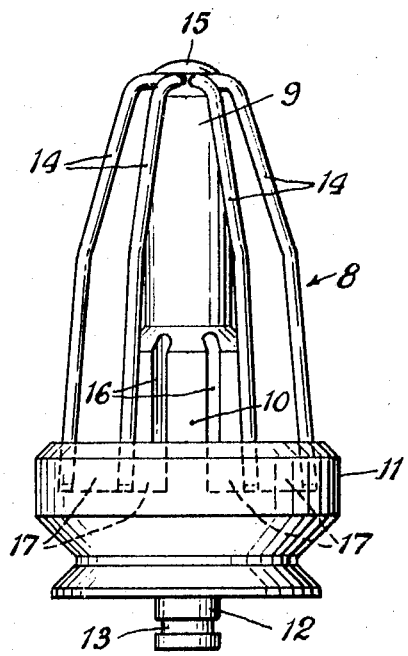
FIG. 3 is an elevation view of a film reel holder provided with six radially resilient coupling members according to the invention.
Figure 4:
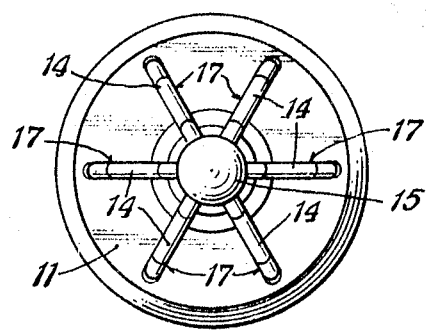
FIG. 4 is a top view of FIG. 3.

The embodiment of the invention illustrated in FIGS. 3 and 4 comprises a film reel holder 8 provided with a core 9 having an enlarged portion 10, a flange 11 in the form of a pulley, a bearing pin 12 with an annular grove 13 therein, and six resilient coupling members 14. The outer end of the core 9 is provided with a concentric bore into which extend the bent-off ends of the six resilient coupling members made of spring steel wire. The outer ends of the coupling members 14 are secured in the concentric bore by means of a closure bolt 15. The enlarged lower portion 10 of the core 9 has a diameter which fits into the smallest receiving aperture of a film reel. Longitudinal grooves 16 in the circumference of the core portion 10 are adapted to accommodate the coupling members 14 when the same are urged radially inwardly.

The lower free ends of the resilient coupling members 14 engage radial slots 17 provided in the flange 11 and are guided within these radial slots 17. In this manner a resilient motion is permited only in radial direction and at the predetermined angle which corresponds to the angular position of the coupling slots provided in the film reel.

In this last described embodiment the film reel may be placed upon the film reel holder 8 at any desired angular position. It will immediately be pre-centered by the six coupling members 14. As soon as the film reel has been rotated on the film reel holder 8 such a distance that the first three coupling members reach the respective coupling slots, the same are engaged by these three coupling members. The other three coupling members are not necessary for the centering of the film reel because this is accomplished by the first three coupling members 14 engaging the coupling slots, but the arrangement of six coupling members 14 reduces the angle of rotation up to the engagement of three coupling members 14 with the three coupling slots in the film reel.

What we claim is:

1. A film reel holder for selectively holding any one of a member of film reels having differently sized center bores and also having at least three coupling slots radially extending from the circumference of the center bores, comprising a cylindrical core provided with a flange at one end thereof and at least three coupling members extending outwardly from the circumferential surface of said cylindrical core and connected with said flange for receiving selectively any one of said number of film reels, the angular position and the dimensions of said coupling members on said core correspond to the position of the coupling slots on the film reels so that said coupling members are able to simultaneously engage said three coupling slots, the diameter of said core being smaller than the smallest center bore of the film reels for which said film reel holder is intended.

2. A film reel holder according to claim 1, in which said radially extending coupling members comprise three ribs formed integrally with said cylindrical core.

3. A film reel holder according to claim 1, in which said radialy extending coupling members comprise three ribs formed integrally with said cylindrical core, at least one of said ribs being transversely resilient along a portion between its ends.

4. A film reel holder according to claim 1, in which said coupling members are made of resilient wire, of which the one ends are brought together near the free end of the core, while the other ends of said wires are received in radial slots formed in said flange provided on said core, the outer ends of said radial slots constituting outward stops for said other ends of said resilient wire coupling members.

5. A film reel holder according to claim 1, in which said coupling members are made of plastic, of which the one ends are brought together near the free end of the core, while the other ends of said coupling members are received in radial slots formed in said flange provided on said core, the outer ends of said radial slots constituting outward stops for said other ends of said plastic coupling members.

6. A film reel holder acocrding to claim 4, in which said core is provided with longitudinal grooves in its circumference which are in communication with the inner ends of said radial slots in said flange, said grooves being adapted to receive said other ends of said wires when the latter are urged radially inwardly.

7. A film reel holder according to claim 1, in which said radially extending coupling members comprise three ribs, at least one of said ribs being resilient in radial direction and formng a detent for securely holding a reel mounted on said holder.

References Cited

UNITED STATES PATENTS

| | | |
|---|---|---|
| 1,479,253 | 1/1924 | Rivetta. |
| 1,908,073 | 5/1933 | Spoor et al. _____ 242—129 |

NATHAN L. MINTZ, Primary Examiner